(12) United States Patent
Jørgensen

(10) Patent No.: US 7,289,774 B2
(45) Date of Patent: Oct. 30, 2007

(54) COMMUNICATIONS METHOD, APPARATUS AND SIGNAL

(75) Inventor: Peter Breinholm Jørgensen, Silkeborg (DK)

(73) Assignee: Interlego AG, Baar (CH)

( * ) Notice: Subject to any disclaimer, the term of this patent is extended or adjusted under 35 U.S.C. 154(b) by 491 days.

(21) Appl. No.: 10/481,187

(22) PCT Filed: Jun. 24, 2002

(86) PCT No.: PCT/DK02/00423

§ 371 (c)(1),
(2), (4) Date: Aug. 19, 2004

(87) PCT Pub. No.: WO03/001840

PCT Pub. Date: Jan. 3, 2003

(65) Prior Publication Data

US 2006/0264185 A1   Nov. 23, 2006

(30) Foreign Application Priority Data

Jun. 22, 2001   (DK) ............................... 2001 00985

(51) Int. Cl.
*H04B 1/04*   (2006.01)
*G08C 7/00*   (2006.01)
(52) U.S. Cl. ............. 455/103; 340/825.69; 340/825.72
(58) Field of Classification Search ............ 455/114.2, 455/103, 105, 68, 63.1, 67.1; 340/825.62, 340/825.64, 825.69, 825.72, 10.2; 370/201, 370/213, 912, 913
See application file for complete search history.

(56) References Cited

U.S. PATENT DOCUMENTS

| | | | | |
|---|---|---|---|---|
| 4,334,221 A | * | 6/1982 | Rosenhagen et al. | 463/6 |
| 5,098,110 A | * | 3/1992 | Yang | 463/39 |
| 5,870,381 A | * | 2/1999 | Kawasaki et al. | 370/213 |
| 6,301,243 B1 | * | 10/2001 | Copper et al. | 370/349 |

FOREIGN PATENT DOCUMENTS

EP   0921657   * 2/2003

\* cited by examiner

*Primary Examiner*—Quochien B. Vuong
(74) *Attorney, Agent, or Firm*—Day Pitney LLP

(57) ABSTRACT

In a system (e.g. a IR or RF based wireless remote control system) comprising a number (N) of non-synchronized transmitters that transmit respective signals, a method of transmitting data in packets to a receiver, comprising the steps of: transmitting the respective signals, said signals having repeated burst periods that are separated by quiescent periods and repeated with mutually different repetition period, wherein the burst periods have substantially the same length, BL, and each burst period comprises a data packet. The method is characterized in that (I) where N denotes the number of transmitters, n is an index denoting a respective one of the N transmitters, $RP_n$ is the repetition period for a transmitter with index n, and BL is the length of the burst periods.

33 Claims, 6 Drawing Sheets

COMMUNICATIONS METHOD, APPARATUS AND SIGNAL

This invention relates to a method in a system comprising a number of non-synchronized transmitters that transmit respective signals. The method involves transmitting the respective signals, said signals having repeated burst periods that are separated by quiescent periods and repeated with mutually different repetition periods, wherein the burst periods have substantially the same length, BL, and each burst period comprises a data packet; and wherein the repetition periods, $RP_n$, are configured such that a succession of at most N−1 transmissions interfere with other of the respective signals. Within the field of remote controls it is important to have a fast and determined maximum response time from issue of a control command in a control set to reception in a the remote controlled device. This criterion is particularly important when the remote controlled device is some type of vehicle or robot since a slow—and undetermined—response time may lead to lack of control over the device.

U.S. Pat. No. 4,334,221 discloses a radio control system for independent remote control of a number of vehicles on a common radio channel. The system provides proportional steering and speed control with a reduced risk of mutual interference. The control sets for controlling the respective vehicles, comprise means for generating control signals with repetitive bursts of successive digital signals separated by quiescent periods that are at least ten times the duration of each burst time duration. The control signals are used to modulate respective radio frequency carriers. The digital signals comprise a unique identity code to allow identification of a respective control in a vehicle. Thereby it is possible to control a plurality of toy vehicles by a plurality of simple asynchronous control sets with a small risk of mutual interference.

However, this piece of prior art involves the problem that the risk of mutual interference exists and consequently can lead to an excessive and undetermined time interval from transmission of a signal to receipt of an undistorted signal. When the object is to control a remote controlled vehicle this time interval can be too long to obtain sufficient control of the vehicle.

EP 0 921 657 discloses an improved control system for independent remote control of a number of vehicles on a common channel. The control system is based on transmitting data signals with bursts of equal length (ie a burst period) transmitted with a repetition period (period n; n=1, 2, . . . , N) in dependence of which of N independent transmitters that transmits the data signal. According to the disclosure, the optimal mutual repetition periods (period n) of the independent transmitters are:

period $n = 2 * \text{burst period} * [(N-1)^2 + n]$.

The above optimal periods n are calculated based on selecting an optimal delta value, where delta is the difference in the repetition periods. The optimal delta value is two times the burst period, but delta can be selected to be greater. Applying the above formula for N equal to three transmitters, periods n are calculated to be $10_{n=1}$, $12_{n=2}$ and $14_{n=3}$ times the burst period, respectively. It is noted that the burst period can be the sum of the length of a burst plus an idle time.

The above control system disclosed in EP 0 921 657 provides only a limited improvement over the prior art system disclosed in U.S. Pat. No. 4,334,221. Confer U.S. Pat. No. 4,334,221 in that the bursts are separated by quiescent periods that are at least ten times the duration of each burst time duration. However, since the system disclosed in EP 0 921 657 is cost attractive it is highly desired to improve the performance of the system with respect to obtaining faster repetition periods.

This problem is solved according to the present invention when the method mentioned in the opening paragraph is characterized in that:

$$2 \cdot N \leq RP_n/BL < 2 \cdot [(N-1)^2 + n]$$

where N denotes the number of transmitters, n is an index denoting a respective one of the N transmitters, $RP_n$ is the repetition period for a transmitter with index n, and BL is the length of the burst periods.

Consequently, and since $RP_n/BL$ is less than $2 \cdot [(N-1)^2 + n]$, a faster throughput time from transmission of a data packet to reception of an undistorted data packet is achieved. This in turn allows for a faster response time when using the system for remote control applications. Thus, it is ensured that the information in a data packet is transferred undistorted and within a period of at most N−1 retransmissions (equal to N transmissions) of a data packet to a respective receiver since at least one out of N data packets will arrive undistorted. The method is intended for use in toys where two, three or more models are simultaneously controlled from two respective remote controls. Generally, it should be noted that it is well known to include in each data packet, a check code for detecting errors.

Preferably, the ratio between $RP_n$ and BL is selected as follows:

$$RP_n/BL \leq 2 \cdot [(N-1)^2 + n] - D_n$$

where $1 < D_n$. Thereby a fast response time is ensured. The response time is in a worst case situation equal to N times the $RP_n$. $RP_n$ is improved by at least one burst period, BL. Additionally, the mutually ratios of repetition periods $RP_n$ are determined.

When $D_n$ is selected to be:

$$D_n = N - n/2 \pm 5\% \text{ of } RP_n$$

the repetition periods are improved (i.e. decreased) by D burst periods. This value of $D_n$ and consequently of repetition periods $RP_n$, provides the fastest possible repetition ratios. The above deviation of ±5% of $RP_n$ can be 4% of $RP_n$, 3% of $RP_n$, or 2% of $RP_n$.

In order to obtain fast response times, the mutual difference between burst repetition periods of transmitters n and n+1, are traditionally selected to be equal to two times the duration of a burst period. However, this is a prejudice preventing improved response times. Therefore, repetition periods of respective signals from transmitters n and n+1 can have a mutual difference greater than two times the duration of a burst period. This difference is also referred to with the symbol Δ. When Δ is varying for different n, the individual differences are referred to with $\Delta_{n, n+1}$. In addition to improving the slowest repetition period, the fastester repetition periods are improved even more.

When the respective repetition periods mutually fulfill the criterion that they are approximately equal to the length of a burst period times two times respective mutually prime numbers that are equal to or larger than the number of transmitters, maximal time intervals between distortions are achieved.

Typically the duration of a data packet is less than or equal to the duration of a burst period.

The bursts can comprise a fixed number of data bits repeated at a bit repetition rate; and the burst repetition period is generated from the bit repetition rate as an integer number of data bits per burst.

Typically, electronic receiver components have a so-called duty-cycle limitation or a limitation on the shortest acceptable pause between two data packets, also denoted telegrams. If such limitations are exceeded, the receiver is more likely to provide a defective output signal. Since other transmitters can transmit signals to a given receiver $R_n$ during quiescent periods of an associated transmitter Tn the above limitations can be exceeded. This problem is solved when the burst period is comprised of a data packet and an idle period in which no data are transmitted. Consequently, the risk of generating defective output signals is reduced.

Preferably, the method comprises the step of: encoding data packets of the respective signal with data, an identity code that identifies a transmitter, and a check code. Thereby a receiver is able to determine whether it should interpret the control data, and by means of the check code it is able to verify whether the data have been distorted. The data can also be denoted payload or control data. Preferably, the check code is a check sum, and/or a CRC-code, and/or a parity bit, and/or a hash-value.

Preferably the method comprises the step of: receiving a respective data packet; determining the identity of a transmitter by examining the identity code; and determining whether the data packet is valid by examining the check code. If the data packet is determined to be valid it can be passed on for further processing.

Often, a receiver (e.g. using a simple 4-bit controller) has very limited processing resources for calculating check codes. However, since interference between bursts occurs frequently, there is a lack of sufficient error detection. In order to solve this problem and according to an important aspect of the invention, the method comprises the step of receiving a data packet and taking the data packet as a valid data packet only if no data are received during the idle period. Thereby, sufficient error detection is provided at a very limited processing effort.

Preferably, the idle period has a length equal to or larger than a data item, wherein said data item is composed of an opening portion, a data portion, and a closing portion. Thereby, longest and expected consecutive sequence of bits with equal value (e.g. 1 start bit+8 data bits+1 parity bit+1 stop bit=11 bit each with a value of 1 or 11 bit each with a value of 0) can occur without erroneously being detected as an idle period.

Typically, it is desired to use relatively cheap components, which often have a relatively low data throughput rate (low baud rate). This dilemma is overcome according to an important aspect of the invention, wherein the method comprises the step of encoding digital values of a block of two or more data bits, to be transmitted, by transmitting two consecutive pulses with a temporal distance, selected from a set of distances, each of which is associated with a digital value. Thereby, a higher effective baud rate is achieved. Hence, for a block of e.g. two bits (possible values of 00, 01, 10, 11), four different temporal distances between two consecutive pulses must be detectable by a receiver with a proper timing circuit. An increase in baud rate by more than a factor of two has been observed.

In preferred embodiments the signals are transmitted by means of infrared light or the signals are transmitted by means of a radio frequency carrier. The invention also relates to a remote control unit, a remote controlled unit, and a signal.

The invention will be explained more fully below in connection with a preferred embodiment and with reference to the drawing, in which.

Figure 1:
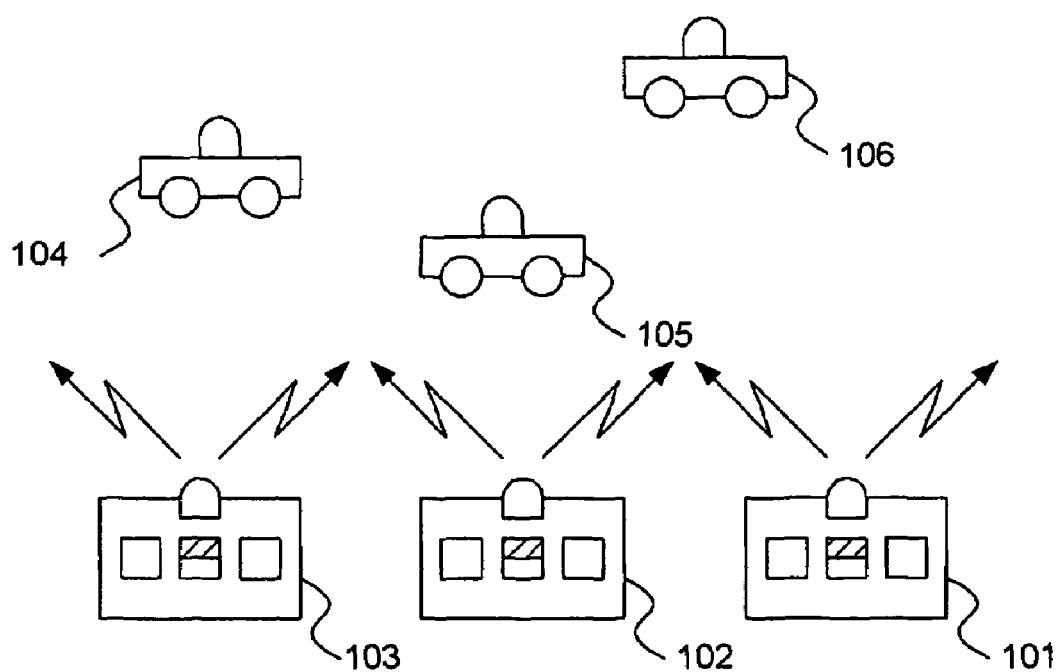
FIG. 1 shows a block diagram of three remote controlled toys and three respective remote controls.

FIG. 1 shows a block diagram of three remote controlled toy vehicles and three respective remote controls. The three remote controls 101, 102 and 103 are arranged to transmit remote control commands to the three respective toy vehicles 104, 105 and 106 by wireless communication. In a preferred embodiment the wireless communication is established by transmission of infrared light signals encoded with digital information representing the remote control commands.

However, other types of communication can be used without departing from the present invention. The information can be transmitted according to known communication techniques comprising modulation of a radio frequency carrier e.g. at 40 MHz. As an alternative to transmitting digital information, analogue information can be transmitted.

Figure 2:
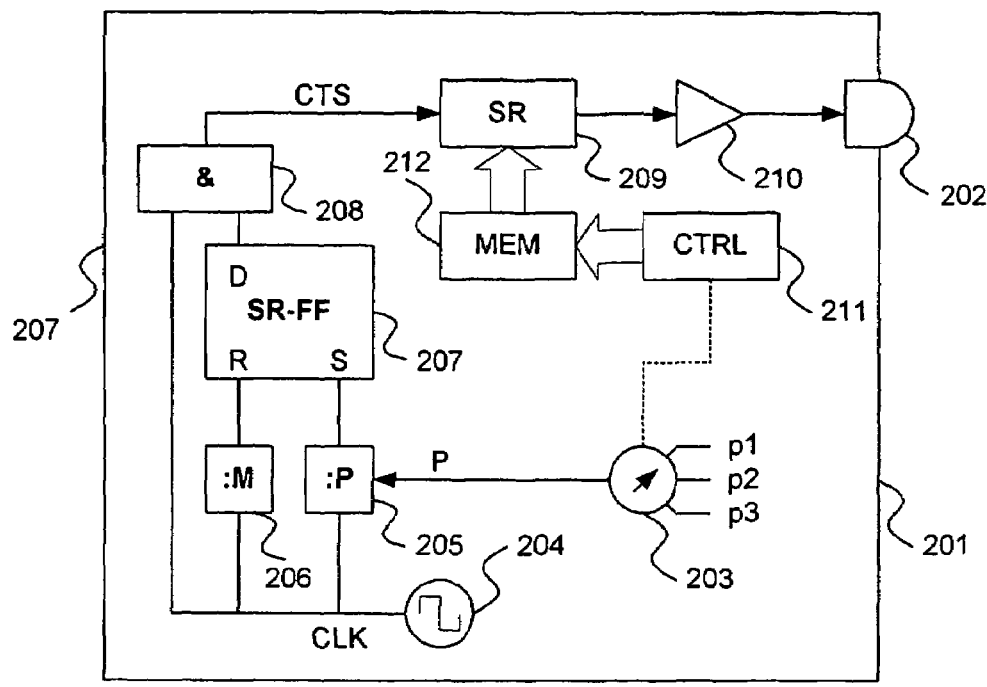
FIG. 2 shows a block diagram of a transmitter.

FIG. 2 shows a block diagram of a transmitter. The transmitter 201 is arranged to transmit remote control commands to a receiver, in an environment where multiple transmitters of the same type is used.

The transmitter 201 comprises an infrared light emitter 202 arranged to emit infrared light at a wavelength about 920 nm, in response to a digital control signal DCS.

The digital control signal is established by retrieving data from a memory at specified intervals by means of a combined clock and timer signal (CTS). The data are addressed in the memory (MEM) 212 by means of a control (CTRL) 211, loaded into a shift register (SR) 209 where it is converted to a serial digital signal in response to the combined clock and timer signal (CTS).

The CTS signal features repeated bursts of clock pulses. The clock pulses, when present in the signal, are repeated at a bit repetition rate; the bursts are repeated with a burst repetition period. Thus since the CTS signal controls the shift register 209, data from the memory 212 are read out in bursts of bits.

The clock pulses in the CTS signal are generated by an oscillator 204 generating clock signal CLK. The clock signal CLK is supplied to a first input of an AND gate 208 and to two digital dividers 205 and 206 dividing the clock signal rate by the integers P and M, respectively. The output from the P-divider 205 is supplied to a SET input of a SET-RESET FLIP-FLOP 207 forcing the output D of the FLIP-FLOP to the digital value "1" every P clock pulse in the clock signal CLK. Likewise, the output from the M divider 206 is supplied to a RESET input of the SET-RESET FLIP-FLOP forcing the output D of the FLIP-FLOP to the digital value "0" every M clock pulse in the clock signal CLK. Thereby, a pulsed signal with a pulse duration of M clock pulses and a cycle time of P clock pulses is generated. Thus, the pulses are repeated every P clock pulse.

The signal at the output D of the FLIP-FLOP is supplied to a second input of the AND gate 208. Thereby, the signal provided at the output of the AND gate is established to have bursts with M clock pulses, where the bursts are separated by quiescent periods with a duration corresponding to a number P-M clock pulses. P is selected to be larger than M.

In a preferred embodiment the value of P can be selected by means of a user operable selector 203 to be either P=p1, P=p2, or P=p3. Thereby three individual transmitters can be used in a system according to the invention by selecting three respective values of P.

The combined clock and timer signal CTS is thereby provided as the output signal from the AND gate 208. This signal is used as a clock signal to the shift register 209 converting parallel data from the memory (MEM) 212 to serial data. The serial data are supplied to a signal buffer 210 connected to control the infrared light emitter 202 by means of the digital control signal DCS.

The control (CTRL) 211 is arranged to supply remote control data, identification data and error check data (e.g. a simple check sum or a Cyclic Redundancy Check—CRC) to the memory 212. The data are generated and supplied to the memory as packets of data in response to a user's commands.

Each packet of data is transmitted in a respective burst.

Preferably, a data packet comprises 2 ID bits, 10 control bits and 4 CRC bits. The two ID bits are used to identify the transmitter in a receiver among a set of—in this preferred embodiment—three transmitters. It is thus possible for the receiver to respond to commands from a selected one of the transmitters only. Hence, a receiver is addressed by a transmitter.

The control (CTRL) 211 is operatively connected to the selector 203 in order to synchronise the ID bits to the selected burst repetition rate—or vice versa.

In a preferred embodiment, each packet of data is transmitted N=3 times equal to the number of transmitters in a system. Thus even if up to two consecutive data packets are interference distorted the (third) data packet can be received. In alternative embodiments, each packet of data is transmitted a number of times equal to the number of transmitters plus one, two, three, or more.

Figure 3:
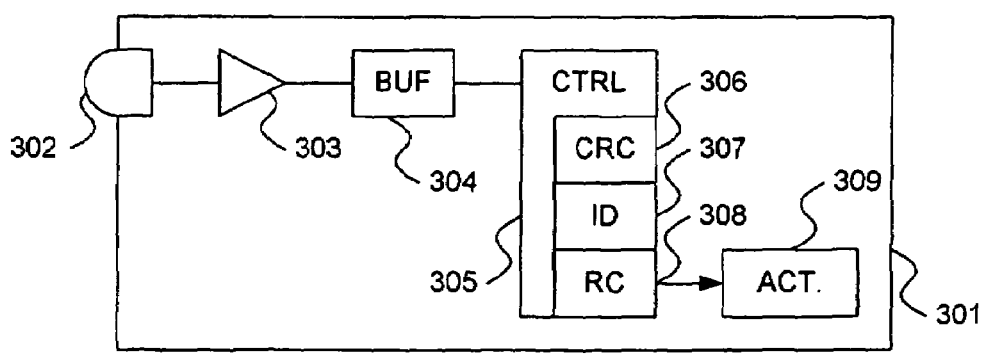
FIG. 3 shows a block diagram of a receiver.

FIG. 3 shows a block diagram of a receiver. The receiver 301 is arranged to receive signals from the transmitter 201. An infrared light receiver 302 converts infrared light signals to an electrical signal that is supplied to a signal buffer 303. The signal buffer 303 is responsible for filtering, detecting and converting the signal to a digital serial signal. The digital serial signal is supplied to a buffer memory (BUF) 304 with a capacity for storing at least one data packet.

A control 305 retrieves data from the buffer memory 304 for subsequent error check in a component 306 of the data packet. If an error in the data packet is detected, the packet is discarded and the control will wait for a new data packet. Alternatively, if no error is detected a component 307 will check for match of the control's own predetermined ID with the ID bits in the received data packet. If no match is detected the data packet is discarded; alternatively, if a match is detected, the control bits in the data packet are passed on to a control bit interpretation component (RC) 308. The RC component 308 is arranged to control action means 309 in response to the control bits. In a preferred embodiment the receiver is used in a remote controlled toy vehicle comprising action means in the form of light emitters for signalling and motors for driving and manoeuvring the vehicle.

Figure 4A:
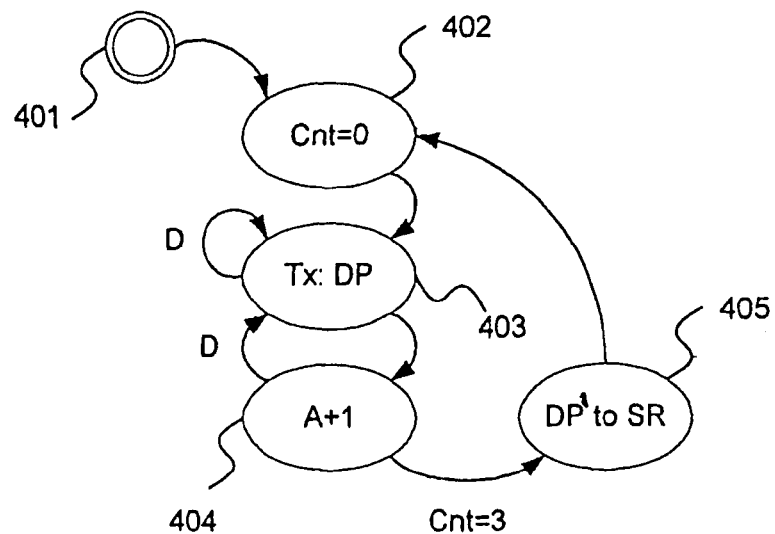
FIG. 4a shows a state diagram for transmitting signals.

FIG. 4a shows a state diagram of a state machine for transmitting signals according to the invention. The state machine is preferably implemented by the controller 211. The machine starts in start state 401 and is clocked by the clock signal provided by the oscillator 204.

From the start state 401 an unconditional transition brings the machine to a state 402 where a counter variable Cnt counting the number of 0-to-1 transitions in the signal provided at the D output of the FLIP-FLOP 207 is set to Cnt=0. Note that the number of 0-to-1 transitions is equal to the number of bursts in the transmitted signal.

In state 403 a data packet DP is transmitted while the D output of the FLIP-FLOP 207 is logical one. This involves retrieving the data packet from the memory 212, loading the data packet into the shift register 209 and clocking the data out to the emitter 202. When this is executed (after M clock pulses) the state machine is brought to state 404 where it will remain until D returns to the logical value one in which case the machine will return to state 403 to retransmit the data packet DP. In fact, DP will be retransmitted two times before the counter variable is increased to the value Cnt=3 bringing the state machine to state 405 wherein a new data packet DP' is loaded to the shift register for subsequent transmission.

When the new data packet DP' has been loaded, the counter Cnt is reset to Cnt=0 and the packet will be transmitted while D=1.

Figure 4B:
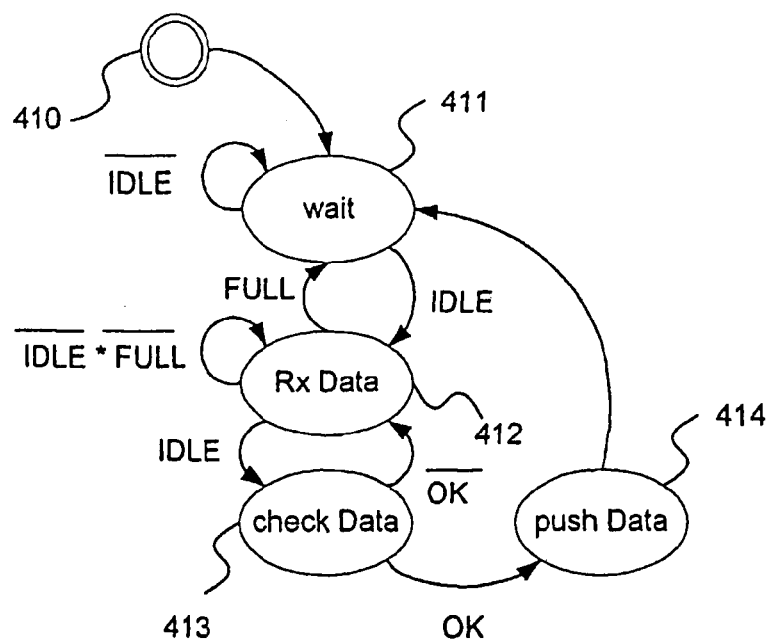
FIG. 4b shows a state diagram for receiving signals.

FIG. 4b shows a state diagram of a state machine for receiving signals. Preferably, controller 305 implements the state machine. The state machine is configured to receive signals wherein a burst period is composed of a data packet and an idle period. The state machine operates on a Boolean input variable, IDLE, indicating whether an idle period has passed; a Boolean variable, FULL, indicating whether a buffer receiving data from the state machine is full or empty; and a Boolean variable, OK, indicating whether a verification of received data was successful.

From start state 410 an unconditional transition brings the machine to a wait state 411 wherein the machine waits while an idle period has not passed that is, while IDLE has the value false. When an idle period has passed, the machine will go to state 412 by means of a transition conditioned on the variable IDLE. In state 412 data is received assuming that IDLE is not true and that FULL is not true. If FULL becomes true in state 412, the machine returns to the wait state 411. On the other hand, if IDLE becomes true, the machine assumes that a complete data item was received and goes to state 413 wherein the received data item is examined for errors. If no errors are detected in the data item the variable OK is set to true and the data item is pushed to a buffer in state 414 wherefrom the machine unconditionally returns to wait state 411. On the contrary, if errors are detected in the data item, the variable OK is set to false and the machine returns to wait state 411 to wait for a new idle period followed by a new data item.

In an alternative embodiment of a transmitter, combinations of bit values are encoded as the temporal distance between two consecutive pulses. The transmitter encodes digital values of a number, ND, of two or more data bits, to be transmitted, by transmitting two consecutive pulses with a temporal distance, selected from a set of distances, each of which is associated with a digital value.

Correspondingly, in an alternative embodiment of a receiver, temporal distances between two consecutive pulses are decoded to combinations of bit values. The receiver decodes a temporal distance (i.e. a time interval) that is determined by a timing circuit in the receiver to a discrete digital value with a number of bits equal to the above number, ND, of data bits.

Figure 5:
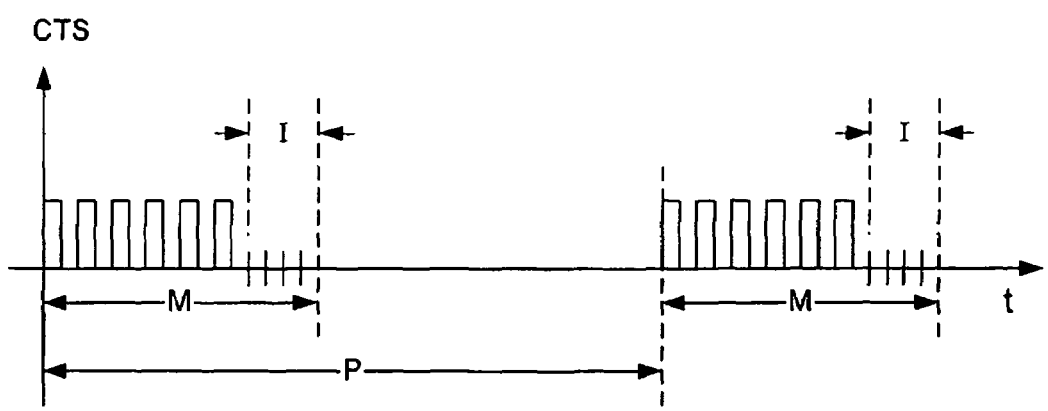
FIG. 5 shows a combined clock and timer signal.

FIG. 5 shows a combined clock and timer signal. The combined clock and timer signal CTS is shown as a function of time t and comprises bursts of M clock pulses; where the bursts are repeated with a repetition period of P clock pulses.

A burst or burst period is composed of a data packet and an idle period. The data packet is located at the first M-I clock pulses and is followed by the idle period located at the last I clock pulses of the burst period.

The idle period can be located both before and/or after the data packet. Checking for an idle period both before and after a data packet will increase the reliability of the received data as opposed to checking only before or after.

Figure 6A:
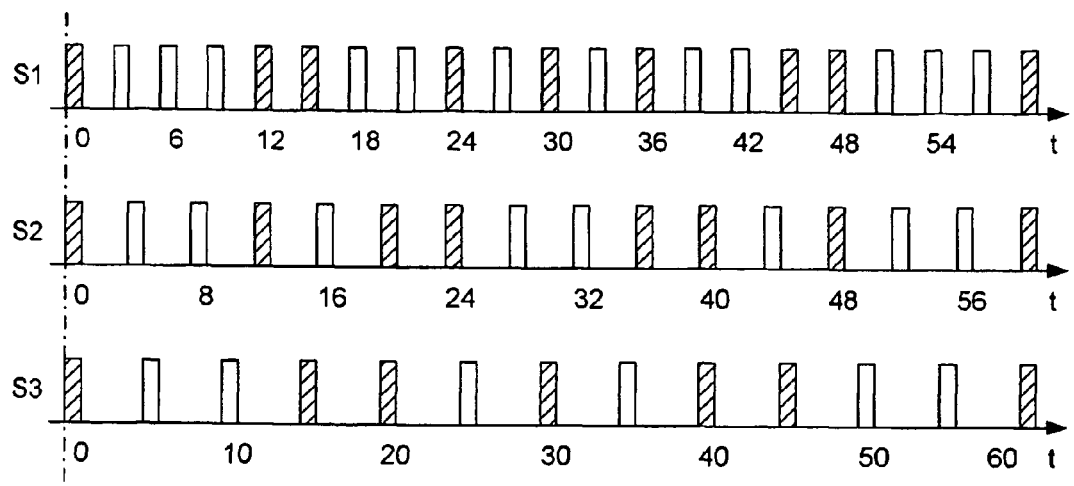
FIG. 6a shows temporal relations of three signals that are mutually in phase.

FIG. 6a shows temporal relations of three signals that are mutually in phase. The three signals S1, S2 and S3 are transmitted by three transmitters of the type shown in FIG. 2, with the selector 203 set to P=p1, P=p2 and P=p3, respectively. The time axis t has units of burst periods.

The ratio of the burst duration to the cycle time also in timeslot units of the burst repetition is denoted the repetition ratio, $RR=RP_n/BL$, or repetition rate. This repetition ratio is unique for each of the signals. Preferably, but not necessarily, the repetition ratio is selected to be an integer number. The signals S1, S2 and S3 have a repetition rate equal to three, four and five, respectively. Since each burst includes 16 bits the burst repetition rate of the three signals S1, S2 and S3 is 16 times 3, 4 and 5 which equals to 48, 64 and 80 bit durations, respectively.

It should be noted that no means are provided for synchronising the individual transmitters; however a situation where the signals from the individual transmitters are in phase is shown. In this situation no more than two successive bursts in any of the signals S1, S2 and S3 will be distorted by any of the bursts in the other signals. This can be confirmed by a study of the coincidence of the bursts in the different signals. Bursts that are distorted are marked with hatching.

Figure 6B:
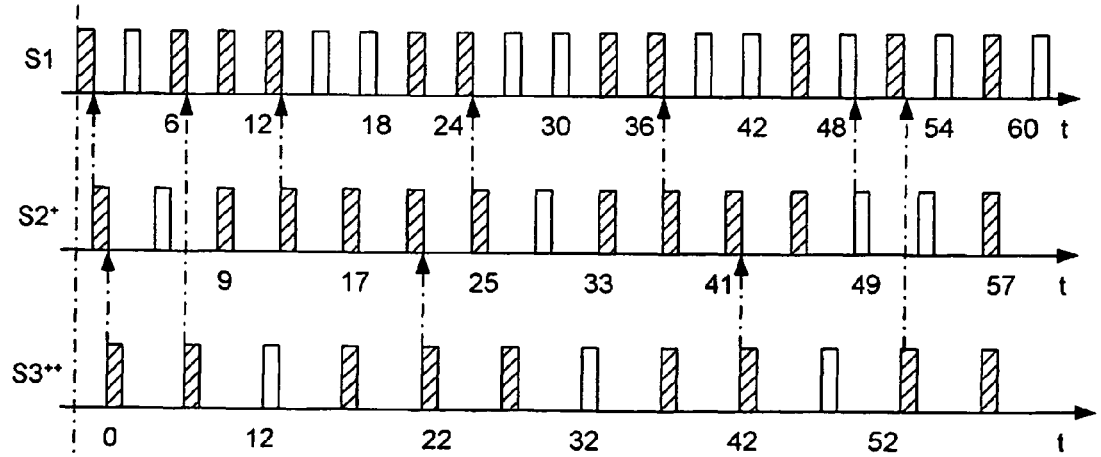
FIG. 6b shows the three signals out of phase.

FIG. 6b shows the three signals out of phase. In this situation the number of consecutive bursts that are interference distorted increases. In the situation shown the signal $S2^+$ is phase adjusted to a worst-case situation where a burst of $S2^+$ is located in timeslot number two, but moved forwards in time an infinitesimal amount of time sufficient to interfere with the burst of S1 that is transmitted in timeslot number one. Likewise the signal $S3^{++}$ is phase adjusted to a worst-case situation where a burst of $S3^{++}$ is located in timeslot number three, but moved forward in time an amount of time sufficient to interfere with the burst of $S2^+$ that is transmitted in timeslot number two. These interference situations are shown with upwardly directed arrows. Additionally, interference occurs when two signals are transmitting a burst in the same timeslot. Hence, in such out-of-phase situation more than two consecutive bursts of a signal can and will be distorted. Hence information transmitted in three consecutive bursts will be lost.

In order to avoid the above problems which will inherently occur it is important to configure the individual transmitters to transmit signals that interfere with each other in a controlled manner only. That is, maximally N-1 out of N transmissions of the same information is allowed to be lost due to interference.

A first method for configuring individual transmitters such that maximally N-1 of N transmission of the same information is lost is:

1) Select $RP_N=2 \cdot BL \cdot [(N-1)^2+N]$;
2) Subtract N/2 from $RP_N$;
3) Select iteratively and starting from $RP_N$: $RP_{n-1}$ to be $RP_{n-1}-\Delta_{n\;n-1}$, where $\Delta_{n\;n-1}$ is a natural number or real number equal to or greater than 2;

wherein N is a natural number greater than 2.

Simulations of the method have shown that by selecting $\Delta n$ or $\Delta$ greater than 2, the greatest repetition period (and the other repetition periods) can be shortened. Thereby, an improvement of the prior art method is realised.

Preferably, but not necessarily, $\Delta_{12}=\Delta_{23}= \ldots =\Delta_{N-1\;N}=\Delta$. Moreover, preferably, $\Delta_n$ or $\Delta$ is approximately equal to 2.1, or 2.3, or 2.4, or 2.5, or 2.6, or 2.7.

A second method for configuring individual transmitters such that maximally N-1 of N transmission of the same information is lost is:

1) Select the repetition ratio for the n'th transmitter such that:

$2 \cdot N \leq RP_n/BL < 2 \cdot [(N-1)^2+n]$;

2) Optionally, select:

$2 \cdot N \leq RP_n/BL < 2 \cdot [(N-1)^2+n]-D$, where $1<D$;

3) Optionally, select:

$2 \cdot N \leq RP_n/BL < 2 \cdot [(N-1)^2+n]-D$, where $D=N-n/2$.

A third method for configuring individual transmitters such that maximally N-1 out of N transmissions of the same information is lost is:

1) Select the smallest repetition ratio to be equal to the number of transmitters;
2) Select the repetition ratio of the signals transmitted by the other transmitters to be mutual prime numbers;
3) Multiply the repetition ratios determined in step 1 and 2 by a factor of two to compensate for out-of-phase situations.

Thereby maximally N-1 out of N transmissions of the same information are lost and at least one transmission of the information will be transmitted successfully—other things being equal. Moreover the second method ensures that a maximum temporal distance between distortions is achieved since the repetition ratios are mutual prime numbers.

For the above two configuration methods it is assumed that the repetition ratios are kept constant; that the burst periods have a constant length i.e. the bursts shall have a constant length or alternatively the bursts shall be shorter in time than the length of a timeslot; that the information transmitted in a burst is transmitted in at least N consecutive transmissions where N is equal to the number of transmitters; and that each burst contains redundancy for verification of its integrity.

Figure 7A:
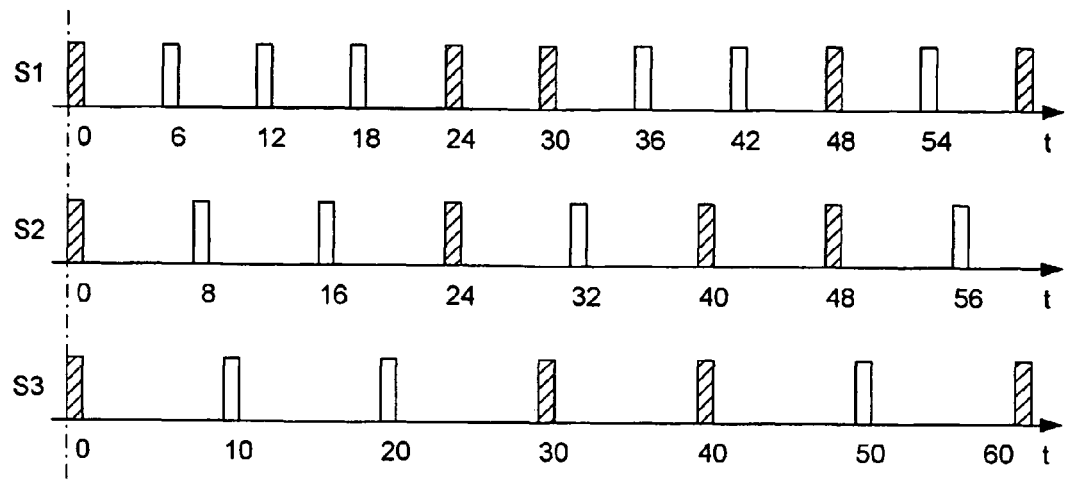
FIG. 7a shows temporal relations of three signals mutual in phase and in accordance with the invention.

FIG. 7a shows temporal relations of three signals mutual in phase and in accordance with the invention. The signals have respective repetition ratios of 6, 8, and 10.

As can be seen an in-phase situation does not involve more than three consecutive interference distortions within the first 60 timeslots. It should be noted that the full period of the sum of the signals is 120 timeslots and that no situation of three consecutive interference distortions will appear over the full period.

Figure 7B:
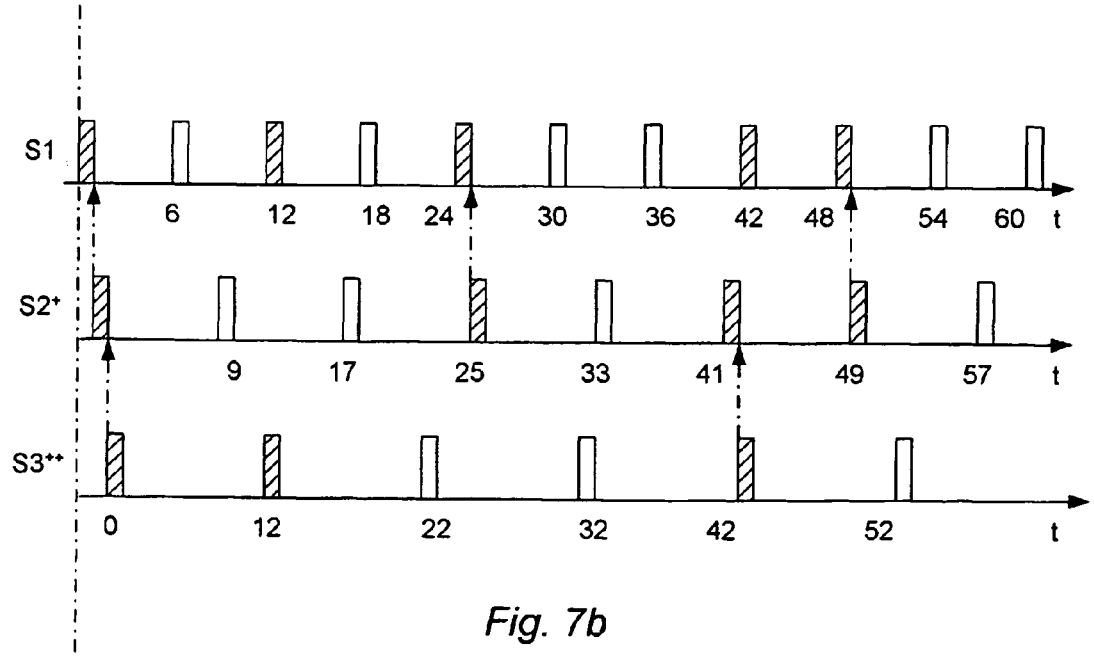
FIG. 7b shows temporal relations of three signals mutual out of phase and in accordance with the invention.

FIG. 7b shows temporal relations of three signals mutually out of phase and in accordance with the invention. Since the repetition ratios of the three signals S1, $S2^+$ and $S3^{++}$ are selected according to the configuration method above, no situations of three consecutive interference distortions appears. The signals S2⁺ and S3⁺⁺ are phase adjusted as explained in connection with FIG. 6b.

The full period of the sum of the signals is 120 timeslots. Hence for a complete overview the timeslots for the respective signals at which a burst is transmitted is shown in table 1 below for a full period of 120 timeslots.

TABLE 1

| ch1' | ch2' (+) | ch3' (++) |
|------|----------|-----------|
| *0   | *1       | *2        |
| 6    | 9        | *12       |
| *12  | 17       | 22        |
| 18   | *25      | 32        |
| *24  | 33       | *42       |
| 30   | *41      | 52        |
| 36   | *49      | 62        |
| *42  | 57       | *72       |
| *48  | 65       | 82        |
| 54   | *73      | 92        |
| 60   | 81       | *102      |
| 66   | 89       | 112       |
| *72  | *97      | *122      |
| 78   | 105      |           |
| 84   | 113      |           |
| 90   | *121     |           |
| *96  |          |           |
| *102 |          |           |
| 108  |          |           |
| 114  |          |           |
| *120 |          |           |

Table 1 shows numbers of timeslots in which a burst for a respective signal occurs. The signals are out-of-phase signals as indicated in FIG. 7b. A number marked with an asterisk (*) indicates that the burst in that timeslot is distorted. The burst of S3⁺⁺ in timeslot #42 is distorted and distorts the burst of S1 that also occurs in timeslot #42. Additionally the burst of S2⁺ in timeslot #41 is distorted because the burst of S3⁺⁺ in timeslot #42 (in fact the whole signal S3⁺⁺) is moved forward in time.

However, from table 1 it can be seen that no more than two consecutive bursts of a signal are distorted.

Examples of applying the above second method of configuring individual transmitters such that maximally N−1 out of N transmissions of the same information are given in table 2 below.

TABLE 2

| Number of transmitters/signals | Repetition ratios |
|---|---|
| 3 | 7.5-10-12.5 |
| 4 | 16.5-19-21.5-24 |
| 5 | 29.5-32-34.5-37-39.5 |

Table 2 shows valid repetition ratios.

Note that the above repetition ratios can deviate up to ±5% of $RP_n$; 4% of $RP_n$, 3% of $RP_n$, or 2% of $RP_n$.

The above method of configuring individual transmitters such that maximally N−1 out of N transmissions of the same information is distorted ensures the shortest burst repetition periods. This makes it possible to obtain the shortest transmission times.

As an example a burst can contain 22 bits and an idle period can contain 11 bits. The bits can be transmitted at 2400 baud or 9600 baud or at another rate. Additionally, it is noted that each transmitter can deviate from such rate due to drift or instability in a transmitter. Moreover, each transmitter can transmit at an individual rate that is substantially (i.e. more than 10%) different form the other transmitters. However, it is important that the system is designed such that the burst period length is not exceeded.

Expediently, the above communication method and apparatus can be used in connection with a video or computer game to allow individual users to interface with the game simultaneously.

Figure 8:
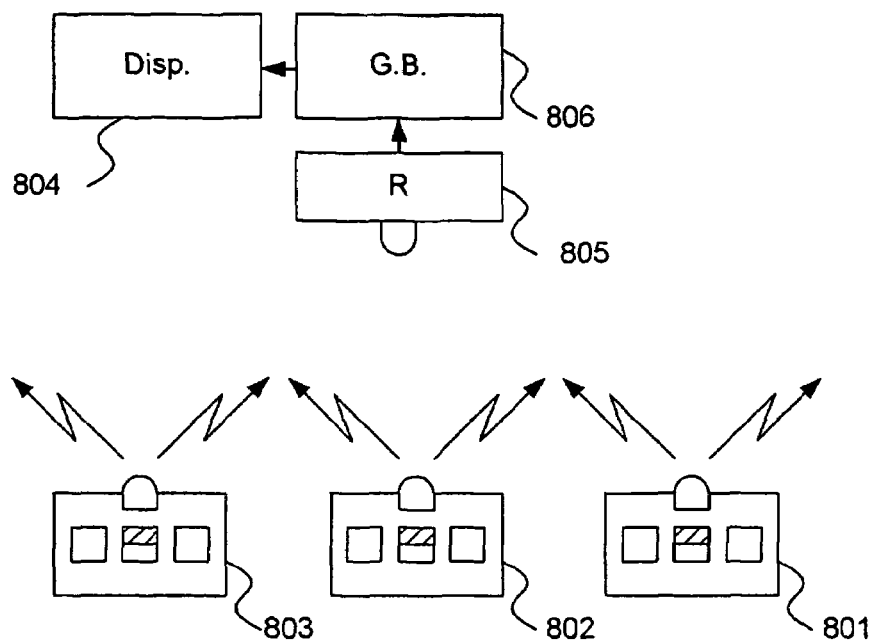
FIG. 8 shows a block diagram of three remote controls for interacting with a video/computer game.

FIG. 8 shows a block diagram of three remote controls for interacting with a video/computer game. The remote controls 801, 802, and 803 transmit infrared signals in accordance with the invention to a receiver 805. The receiver 805 is configured to comprise the functionality of the three receivers shown in FIG. 3 that is, the receiver is configured to respond to commands from the individual transmitters. A received command is transmitted to a game-box 806 along with information about which of the transmitters that issued the command. The game-box can thus be arranged to react on commands issued by respective users. The game-box is connected to a display screen 804 comprising audio/visual means for executing the game.

Thus, according to the invention both individual receivers and a single receiver can be used in connection with multiple transmitters.

The invention claimed is:

1. In a system comprising a number (N) of non-synchronized transmitters that transmit respective signals, a method of transmitting data in packets to a receiver, comprising the steps of:

transmitting the respective signals, said signals having repeated burst periods that are separated by quiescent periods and repeated with mutually different repetition periods, wherein the burst periods have substantially the same length, BL, and each burst period comprises a data packet; and wherein the repetition periods, $RP_n$, are configured such that a succession of at most N−1 transmissions interfere with other of the respective signals wherein $$2 \cdot N \leq RP_n/BL < 2 \cdot [(N-1)^2 + n]$$

where N denotes the number of transmitters, n is an index denoting a respective one of the N transmitters, $RP_n$ is the repetition period for a transmitter with index n, and BL is the length of the burst periods.

2. A method according to claim 1, wherein the repetition periods, $RP_n$, are configured such that a succession of at most N−1 transmissions interfere with other of the respective signals wherein $$RP_n/BL < 2 \cdot [(N-1)^2 + n] - D_n$$

where $1 < D_n$ and,
   N denotes the number of transmitters, n is an index denoting a respective one of the N transmitters, $RP_n$ is the repetition period for a transmitter with index n and BL is the length of the burst periods.

3. A method according to claim 2 wherein $$D_n = N - n \; / 2 \pm \% \text{ of } RP_n.$$

4. A method according to claim 1, wherein repetition periods of respective signals have a mutual difference equal to or greater than two times the duration of a burst period.

5. A method according to claim 1, wherein the respective repetition periods mutually fulfills the criterion that they are approximately equal to the length of a burst period times two times respective mutually prime numbers that are equal to or larger than the number of transmitters.

6. A method according to claim 1, wherein the duration of a data packet is less than or equal to the duration of a burst period.

7. A method according to claim 1, wherein the bursts comprise a fixed number of data bits repeated at a bit repetition rate, and the burst repetition period is generated from the bit repetition rate as an integer number of data bits per burst.

8. A method according to claim 1, wherein the burst period is comprised of a data packet and an idle period in which no data are transmitted.

9. A method according to claim 1, further comprising the step of encoding data packets of the respective signal with control data, an identity code and a check code.

10. A method according to claim 9, further comprising the steps of:
receiving a respective signal;
determining the identity of a transmitter by examining the identity code;
and determining whether the signal is valid by examining the check code.

11. A method according to claim 1, further comprising the step of receiving a data packet and taking the data packet as a valid data packet only if no data are received during the idle period.

12. A method according to claim 11, wherein the idle period has a length equal to or larger than a data item, wherein said data item is further composed of an opening portion, a data portion, and a closing portion.

13. A method according to claim 1, further comprising the step of encoding digital values of a block of two or more data bits, to be transmitted, by transmitting two consecutive pulses with a temporal distance, selected from a set of distances, each of which is associated with a digital value.

14. A method according to claim 1, wherein the signals are transmitted by means of infrared light.

15. A method according to claim 1, wherein the signals are transmitted by means of a radio frequency carrier.

16. A remote control unit having means for transmitting a respective signal using a method according to claim 1.

17. A remote-controlled unit having means for receiving a respective signal of the type disclosed by claim 1.

18. A method according to claim 1, wherein repetition periods of respective signals have a mutual difference equal to or greater than two times the duration of a burst period.

19. In a system comprising a number (N) of non-synchronized transmitters that transmit respective signals, a method of transmitting data in packets to a receiver, comprising the steps of:
transmitting the respective signals, said signals having repeated burst periods that are separated by quiescent periods and repeated with mutually different repetition periods,
wherein the burst periods have substantially the same length, BL, and each burst period comprises a data packet; and
wherein the repetition periods, $RP_n$, are configured such that a succession of at most N−1 transmissions interfere with other of the respective signals;

characterized in that:

$$2 \cdot N \leq RP_n/BL < 2 \cdot [(N-1)^2 + n]$$

where N denotes the number of transmitters, n is an index denoting a respective one of the N transmitters, $RP_n$ is the repetition period for a transmitter with index n, and BL is the length of the burst periods, and further comprising the step of encoding digital values of a block of two or more data bits, to be transmitted, by transmitting two consecutive pulses with a temporal distance, selected from a set of distances, each of which is associated with a digital value.

20. A method according to claim 19, wherein $$RP_n/BL < 2 \cdot [(N-1)^2 + n] - D_n$$

where $1 < D_n$.

21. A method according to claim 20 wherein $$D_n = N - n / 2 \pm 5\% \text{ of } RP_n.$$

22. A method according to claim 19, wherein the respective repetition periods mutually fulfills the criterion that they are approximately equal to the length of a burst period times two times respective mutually prime numbers that are equal to or larger than the number of transmitters.

23. A method according to claim 19, wherein the duration of a data packet is less than or equal to the duration of a burst period.

24. A method according to claim 19, wherein the bursts comprise a fixed number of data bits repeated at a bit repetition rate, and the burst repetition period is generated from the bit repetition rate as an integer number of data bits per burst.

25. A method according to claim 19, wherein the burst period is comprised of a data packet and an idle period in which no data are transmitted.

26. A method according to claim 19, further comprising the step of encoding data packets of the respective signal with control data, an identity code and a check code.

27. A method according to claim 19, further comprising the steps of:
receiving a respective signal;
determining the identity of a transmitter by examining the identity code;
and determining whether the signal is valid by examining the check code.

28. A method according to claim 19, further comprising the step of receiving a data packet and taking the data packet as a valid data packet only if no data are received during the idle period.

29. A method according to claim 28, wherein the idle period has a length equal to or larger than a data item, wherein said data item is further composed of an opening portion, a data portion, and a closing portion.

30. A method according to claim 19, wherein the signals are transmitted by means of infrared light.

31. A method according to claim 19, wherein the signals are transmitted by means of a radio frequency carrier.

32. A remote control unit having means for transmitting a respective signal using a method according to claim 19.

33. A remote-controlled unit having means for receiving a respective signal of the type disclosed by claim 19.

* * * * *